United States Patent [19]

Lindow et al.

[11] 4,038,889
[45] Aug. 2, 1977

[54] ELECTRONIC TRANSMISSION CONTROLLER

[75] Inventors: Carl E. Lindow; Craig L. Joseph, both of San Jose; Fred J. Caterina, Cupertino; Harlan N. Howard, Sunnyvale, all of Calif.

[73] Assignee: FMC Corporation, San Jose, Calif.

[21] Appl. No.: 577,522

[22] Filed: May 14, 1975

[51] Int. Cl.² .................................... B60K 21/00
[52] U.S. Cl. ........................................... 74/866
[58] Field of Search ............... 74/752 A, 752 D, 866, 74/336, 336.5, 337

[56] References Cited

U.S. PATENT DOCUMENTS

| 3,726,159 | 4/1973 | Mizote | 74/752 D |
| 3,727,488 | 4/1973 | Wakamatsu | 74/866 |
| 3,732,755 | 5/1973 | Beig | 74/866 |
| 3,826,158 | 7/1974 | Flaig | 74/752 D |
| 3,885,472 | 5/1975 | Wakamatsu | 74/866 |

Primary Examiner—Benjamin W. Wyche
Assistant Examiner—Frank H. McKenzie, Jr.
Attorney, Agent, or Firm—R. S. Kelly; J. F. Schipper; C. E. Tripp

[57] ABSTRACT

An electronic transmission controller for determining the shift points of a powered vehicle with a plurality of forward and reverse gears and a neutral gear shift position wherein a throttle setting signal, a vehicle speed signal and a gear range select signal are monitored and processed to produce optimum shift points, gear change commands, forward-reverse shift commands and a throttle inhibit signal to facilitate downshifting of the transmission. With the exception of the throttle transducer, the monitoring and processing means are primarily digital.

7 Claims, 10 Drawing Figures

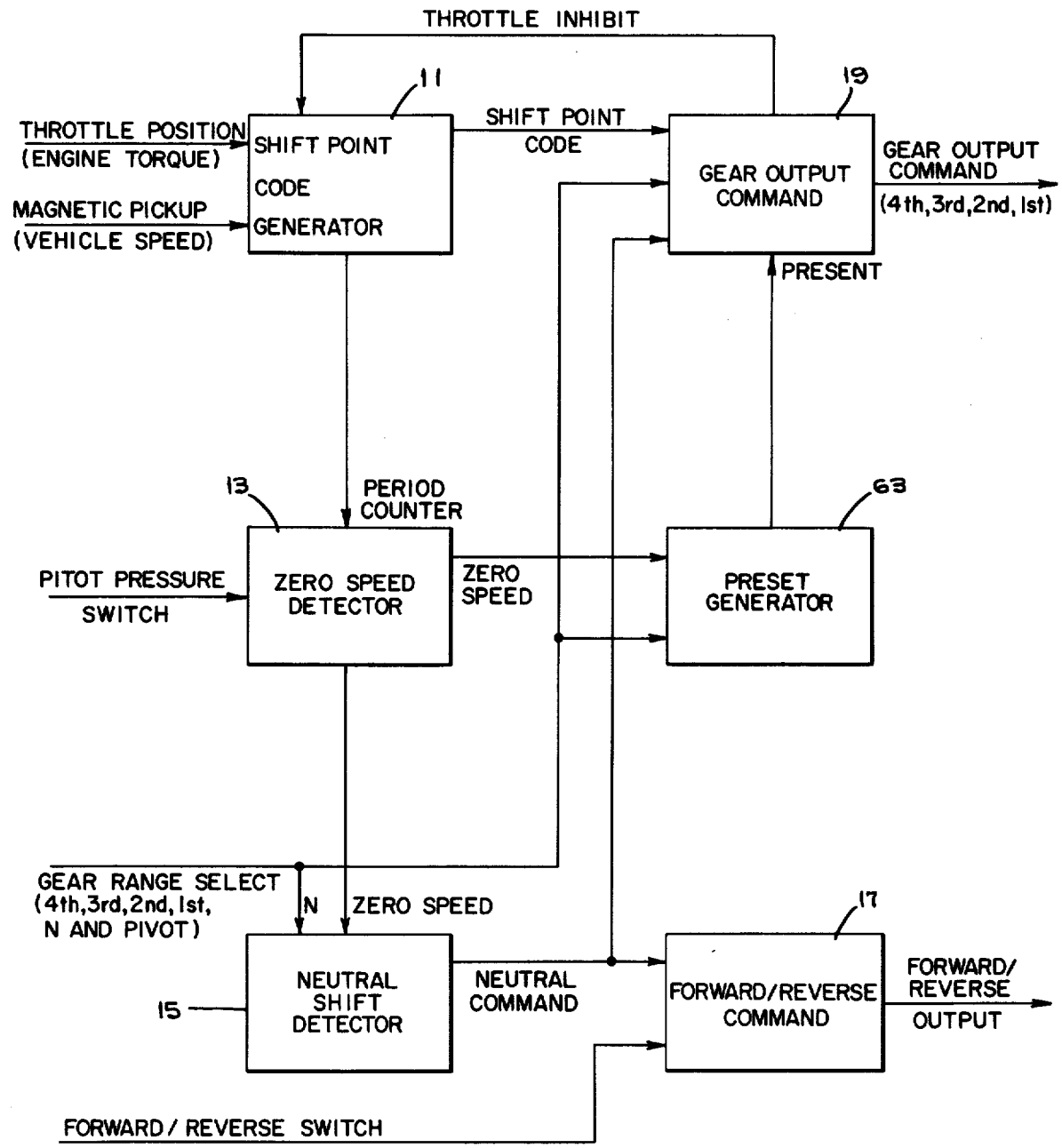

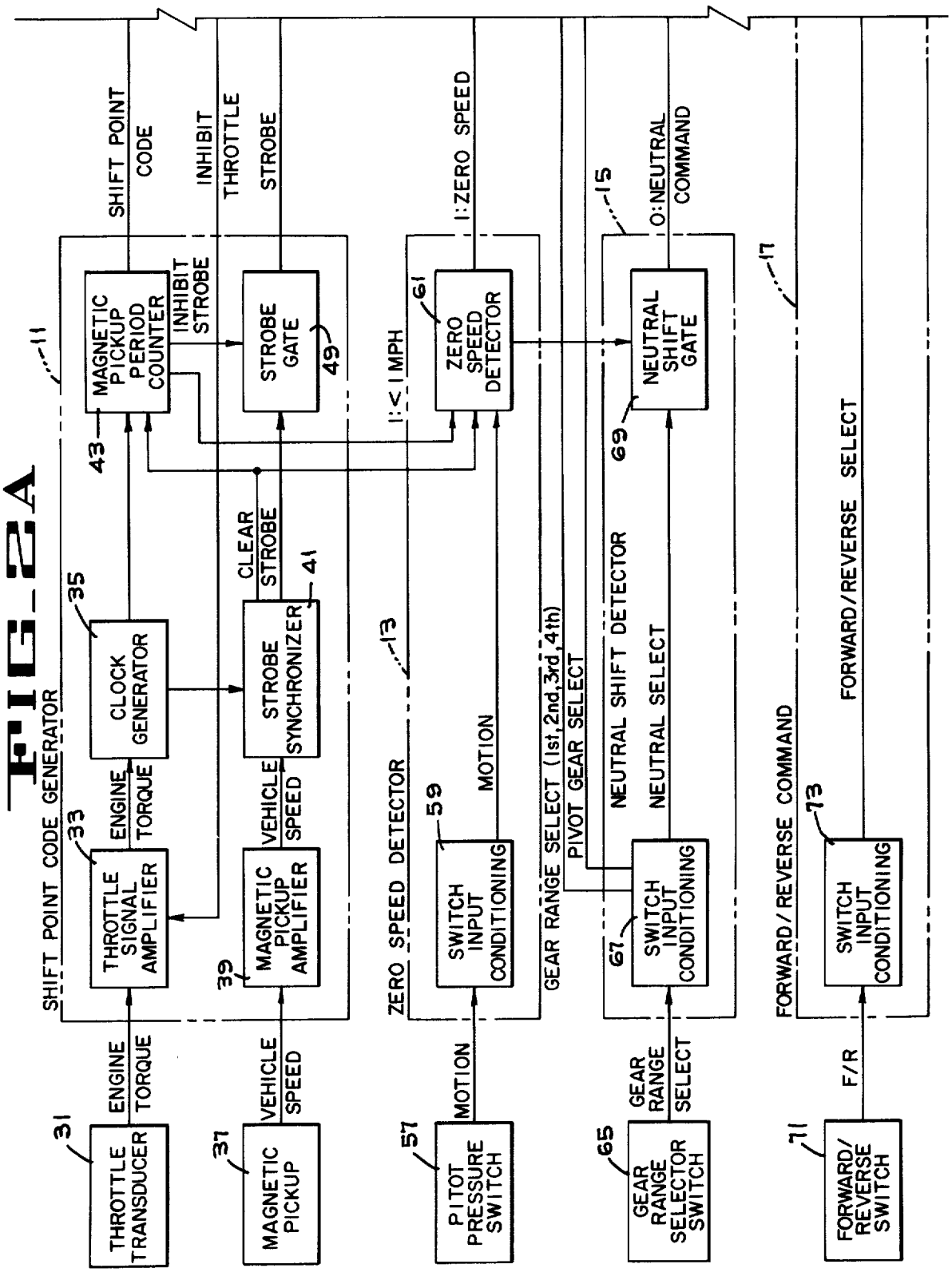
FIG_2A

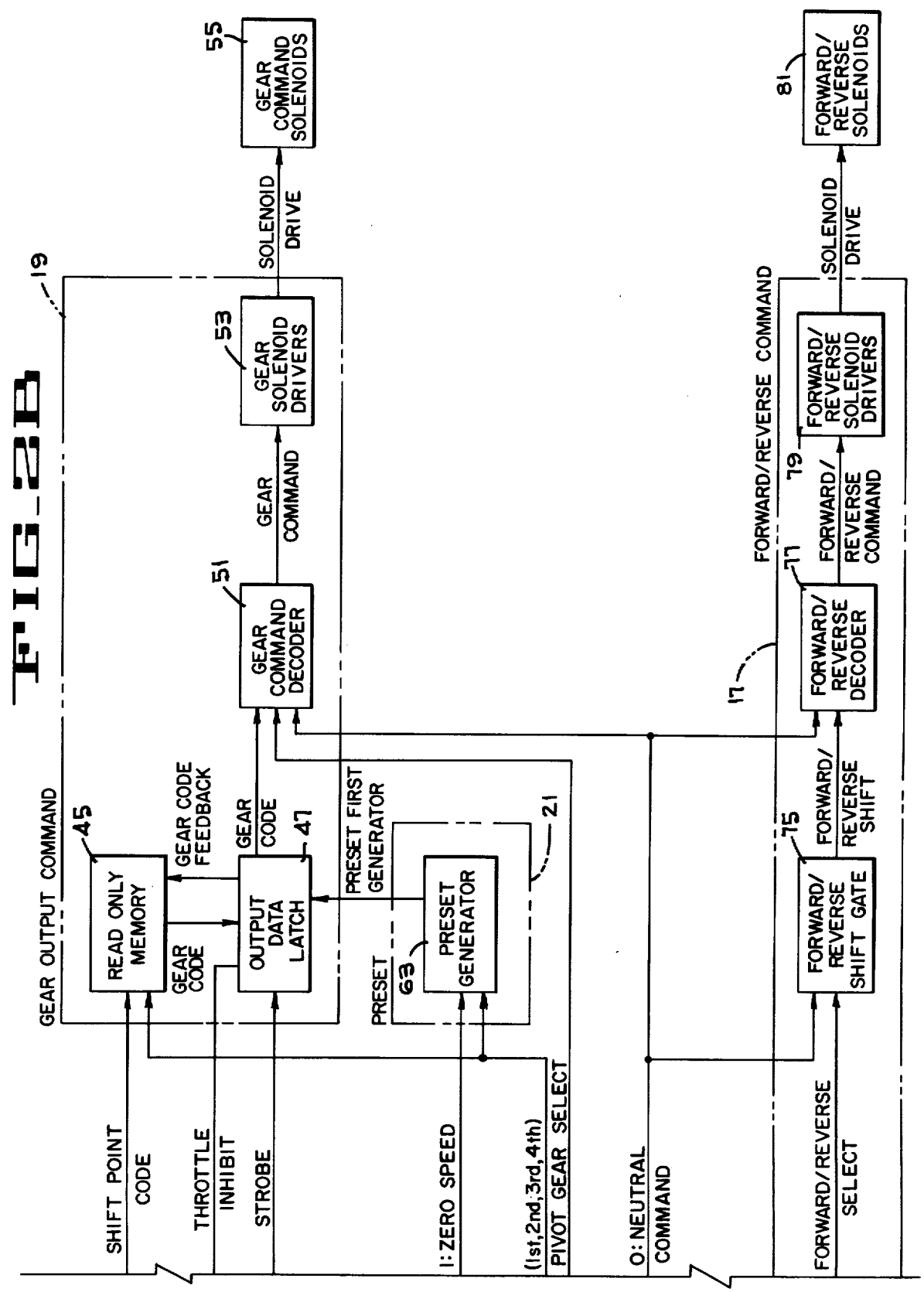

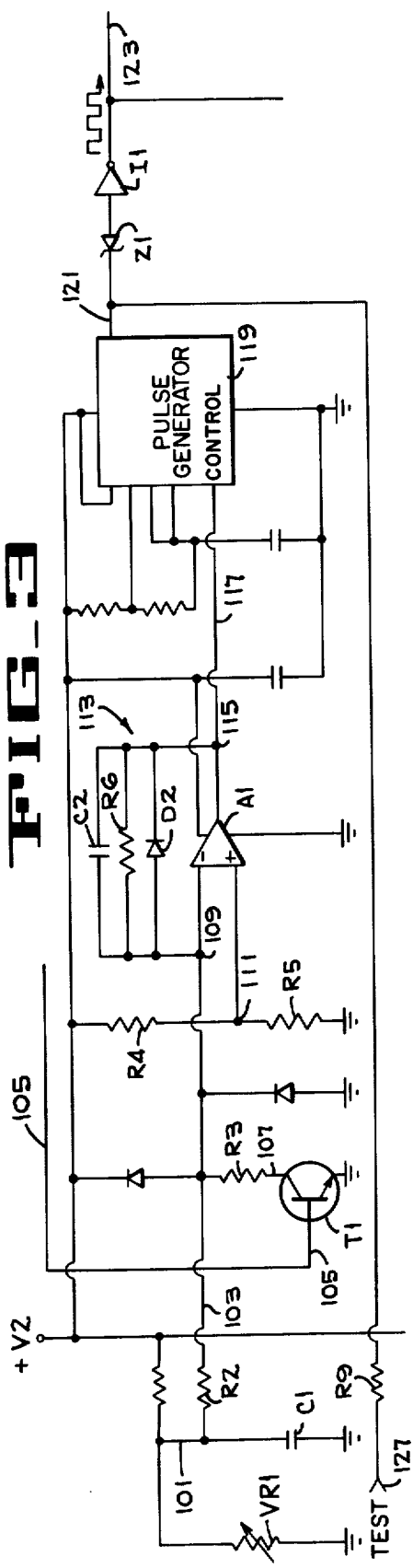
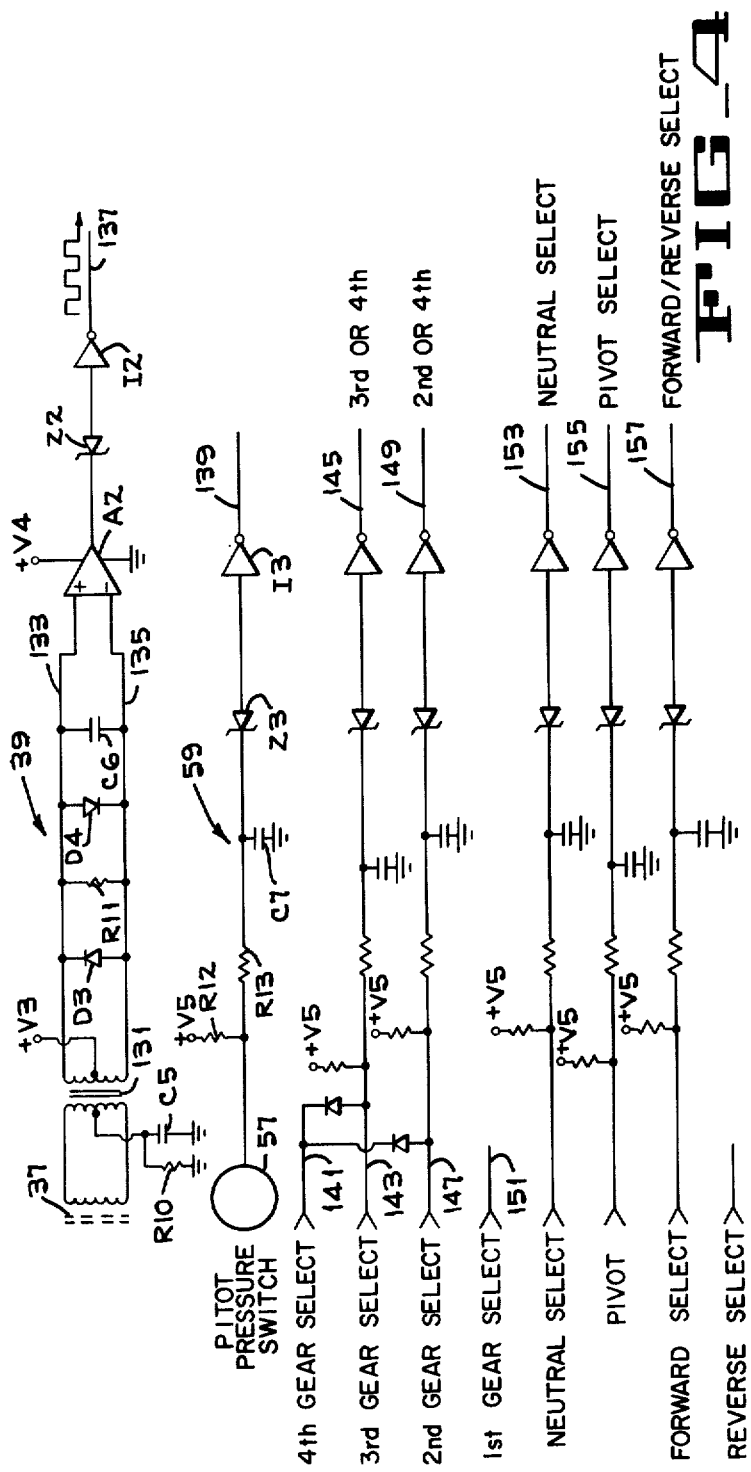
FIG. 3
FIG. 4

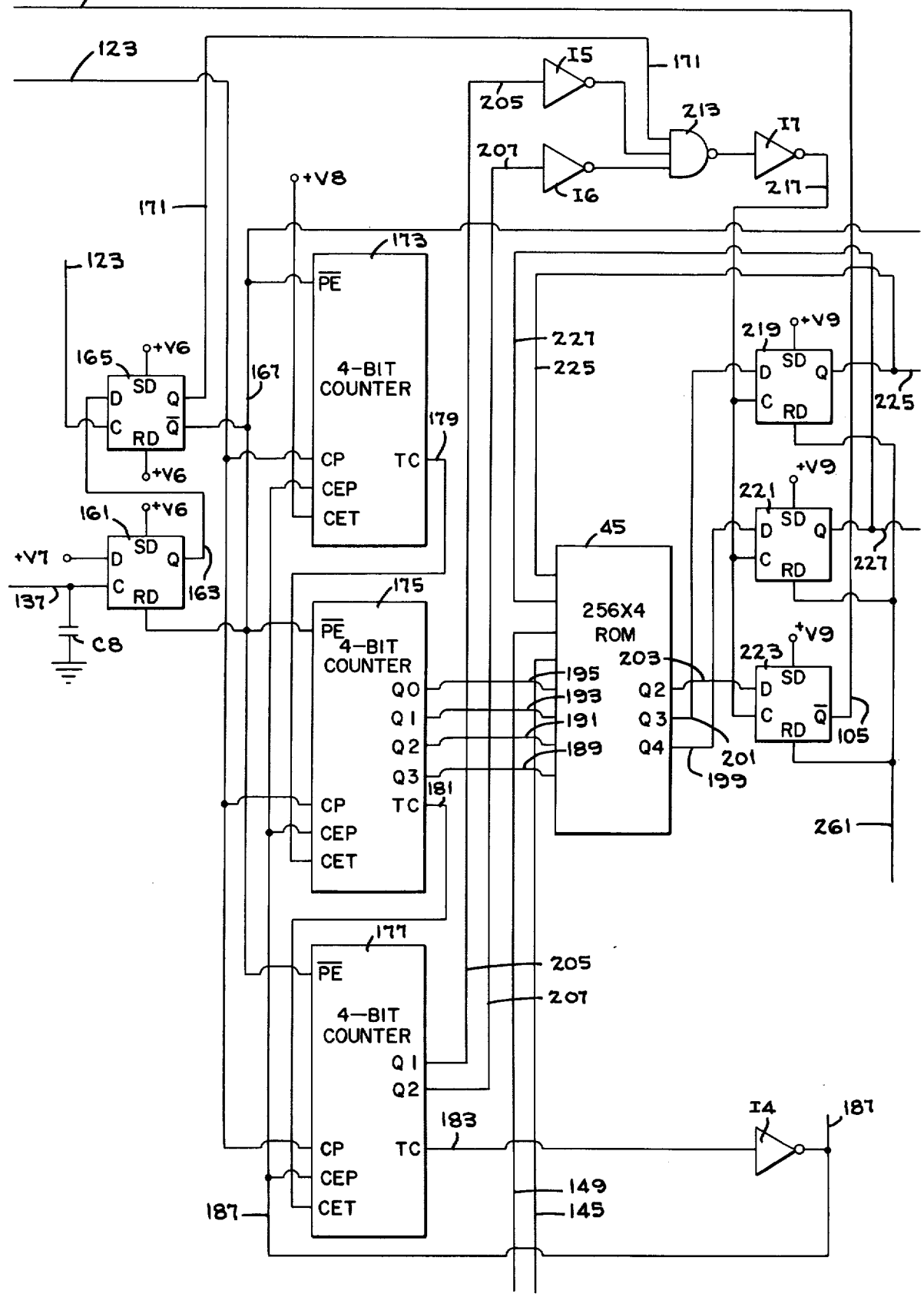
FIG_5

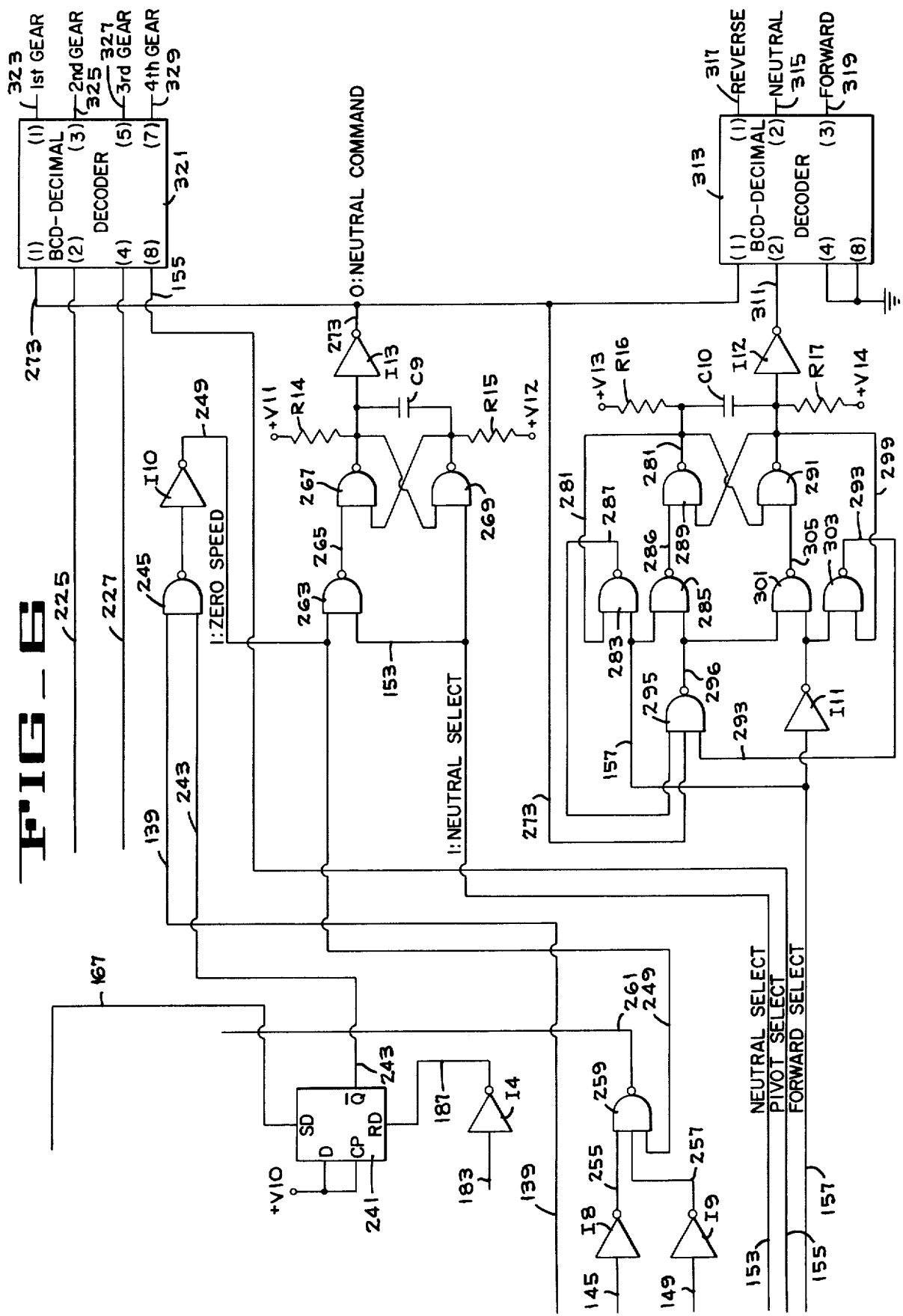

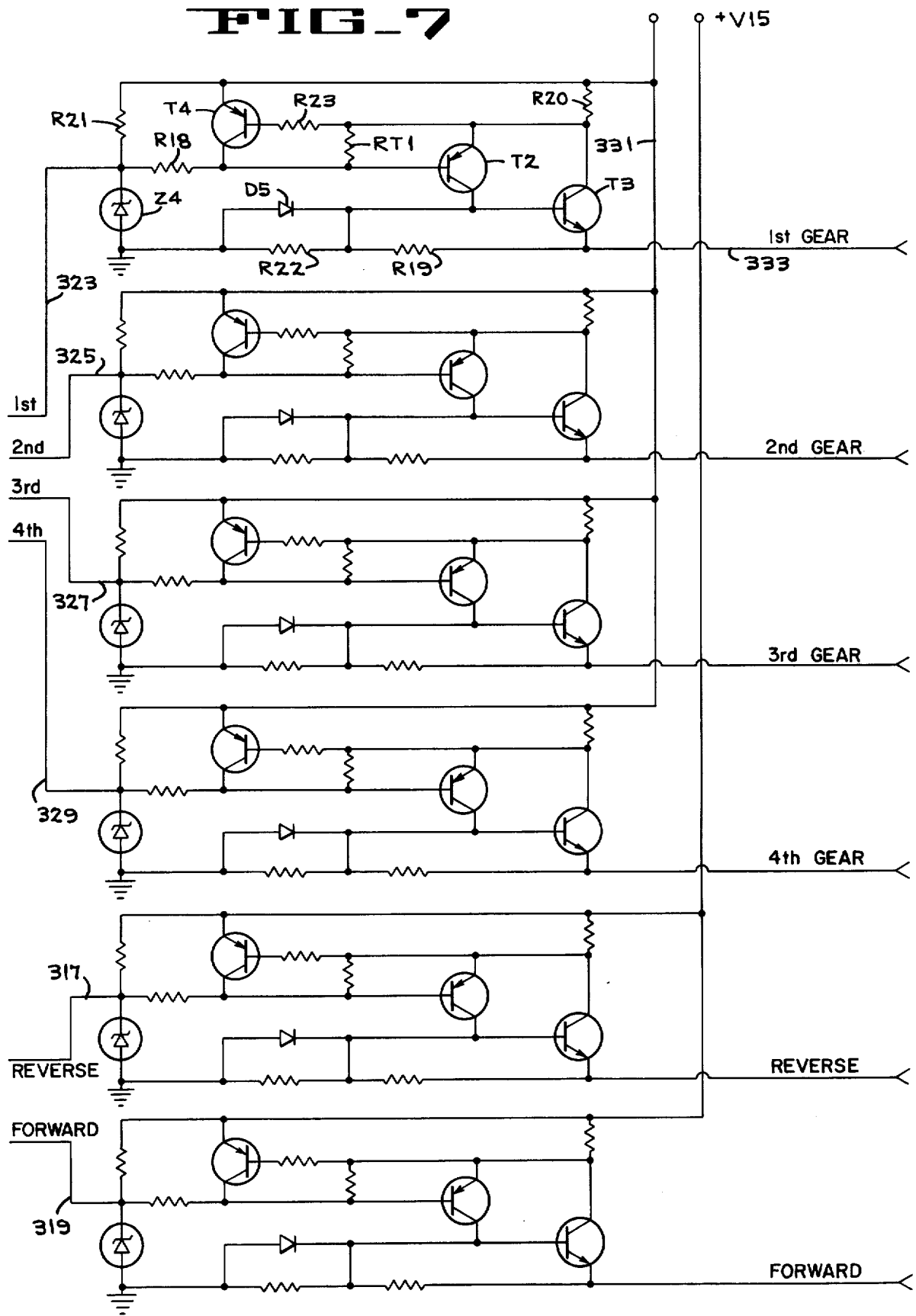

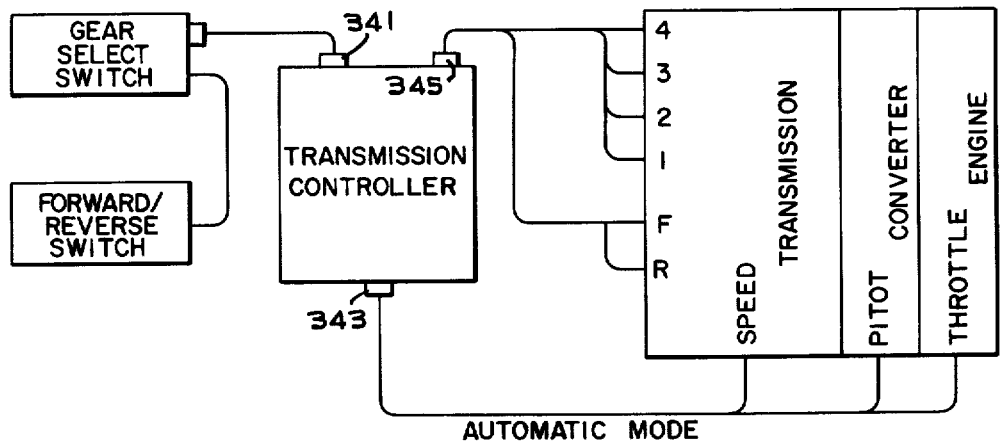
FIG_8A
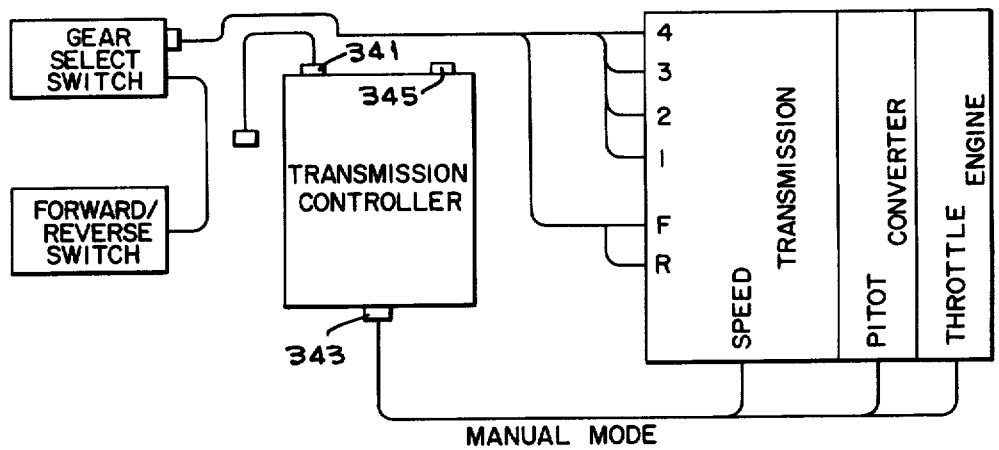
FIG_8B

ELECTRONIC TRANSMISSION CONTROLLER

BACKGROUND OF THE INVENTION

1. Field of the Invention

This invention pertains to an automatic transmission controller for powered vehicles and more particularly to electronic transmission control of a vehicle having a plurality of gears in the forward and reverse directions.

2. Description of the Prior Art

The trend in powered vehicles in recent years has been toward increased size and articulation of the vehicles. Reliable mechanical transmission shift linkages for such vehicles have become costly to design and build and require frequent adjustment and maintenance due to mechanical wear. Further, where such linkages are manually activated by he vehicle operator, potential damage to the transmission due to operator error increases with the size and complexity of the vehicle.

Electronic controls for generating transmission shift patterns are known in the prior art. A pertinent example is the U.S. Pat. No. 3,640,156 to Mori et al disclosing a control system which continuously monitors and uses signals indicative of: (1) speed selector lever position; (2) throttle valve setting; (3) engine intake manifold vacuum; (4) vehicle ground speed; (5) engine temperature; and (6) road grade. These signals are used to determine both upshifting and downshifting points.

U.S. Pat. No. 3,646,835 to Ito et al. discloses a shift control system using combined electrical and hydraulic controls. The gear shift point is determined by comparison of engine throttle opening and transmission output shaft speed (angular velocity), using discrimination circuits. The digital reading which represents the angular velocity of the output shaft is immediately converted to an analog signal for subsequent comparison purposes.

U.S. Pat. No. 3,702,572 to Wakamatsu et al discloses an automatic transmission control system which monitors throttle setting, vehicle speed and road grade to determine gear shift points. The driving signals are processed by analog circuitry until the gear shift decisions are made, after which digital logic circuitry and memory means are used to control the gear change solenoids.

U.S. Pat. No. 3,703,109 to Irie et al discloses an electronic transmission control device which effects smooth downshifting by determining a "neutral" interval (no upshift or downshift) in accordance with engine torque and vehicle speed. The Irie circuitry (all analog) derives a first voltage signal varying directly with engine torque and a second voltage signal varying inversely with vehicle speed; these signals are processed and combined by standard analog techniques.

The U.S. Pat. No. 3,732,755 to Beig et al. discloses an electronic transmission control system which monitors throttle setting, vehicle speed and gear select lever position. The signals are processed digitally and are combined to provide gear shift signals. A magnetic pickup device on the vehicle wheels provides a digital pulse count representing vehicle speed, and the interval over which such pulses are counted is determined by an analog voltage signal proportional to engine load.

SUMMARY OF THE INVENTION

The subject invention includes a means of electronically and automatically controlling the transmission, through continuous electronic monitoring of throttle setting, vehicle speed and transmission gear range selected by the operator, to automatically produce a gear code indicating permissible gear choices and optimum shift points and to generate gear shift commands for the transmission. The electronic transmission controller may also be operated manually, as herein described; but it is the automatic mode of operation which is most appealing, offering the following advantages: (1) all shift points occur at optimum vehicle speeds relative to current throttle setting; (2) the possibility of driver error is virtually eliminated, so that the need for substantial driver training and exercise of driver judgment is minimized.

The subject invention generally comprises electronic transmission control circuitry for a powered vehicle, having a neutral gear position and a plurality of forward and reverse gears, which circuitry monitors vehicle speed and engine throttle setting to determine a gear shift point code indicating permissible gear positions and shift points. Gear range selection is further monitored, and this signal is combined with the gear shift point code to determine gear activation commands for the transmission. The determination of the gear shift point code is made by utilizing the engine throttle setting to vary the frequency of a high frequency pulse train, with the pulses from the vehicle speed monitoring means being used to determine intervals for counting the high frequency pulses.

As a special feature of the preferred embodiment of the invention, if the gear range selector calls for a lower gear than the current gear command, a throttle inhibit signal is produced in a feedback loop which simulates a full throttle setting as input to the gear shift point code generating means so as to facilitate subsequent downshift of the transmission. Separate comparison means, monitoring the forward/reverse directional gearing selected and the neutral gear command signal, prevents the transmission from executing a forward-reverse shift without the vehicle first passing through neutral gear and without the vehicle speed first dropping below about 1 mile per hour.

It is a primary object of the subject invention to provide an electronic transmission controller for a powered vehicle which automatically determines optimum gear shift positions and issues gear change commands to the transmission, where appropriate.

BRIEF DESCRIPTION OF THE DRAWINGS

FIG. 1 is a functional block diagram exhibiting the seven basic signal processing functions of the circuitry of the present invention.

FIGS. 2A and 2B taken together comprise a more detailed block diagram of the circuitry of the present invention showing the fundamental signal processing units implementing each of the seven basic processing functions.

FIG. 3 is the preferred embodiment of the circuitry for the throttle transducer, throttle signal amplifier and conditioner, and clock generator, shown schematically in FIG. 2.

FIG. 4 is the preferred embodiment of the amplifier and conditioner circuitry for the magnetic pickup signals, Pitot pressure switch signals, gear range select signals, pivot signal, and forward/reverse gearing select signals.

FIG. 5 shows the details of the preferred embodiment of the strobe synchronizer, magnetic pickup period counter, strobe gate, read only memory and output data latch circuits.

FIG. 6 exhibits the details of the preferred embodiment of the preset generator, zero speed detector, neutral shift gate, gear command decoder, forward/reverse shift gate and forward/reverse decoder circuits.

FIG. 7 shows the circuitry details of the preferred embodiment of the gear command solenoids and forward/reverse gearing solenoids.

FIGS. 8A and 8B are schematic diagrams illustrating, respectively, the automatic and manual modes of operation of the transmission controller of the present invention.

DESCRIPTION OF THE PREFERRED EMBODIMENT

In the described preferred embodiment of the invention, the transmission, for the purposes of illustration, includes a hydraulic torque converter with automatic lockup clutch and gearing provided for four speeds forward and two speeds in reverse. The four gear speeds forward and also the two gear speeds in reverse have a progression ratio of 1.8:1 relative to the next lowest gear. Upshift occurs from each gear to the next higher one (in forward or in reverse) at 2800 r.p.m., with the engine at full throttle.

With the engine operating at less than full throttle, the upshift points are modulated downward, with maximum modulation limited to 40% of full throttle setting. Built-up hysteresis provides downshifting at 75% of the speed corresponding to upshit, for a given throttle position, so that "hunting" between gears is prevented. Where downbraking occurs at a forward speed, the normal downshift pattern (4 to 3 to 2 to 1 to neutral) is followed; the analogous downshift pattern obtains for downbraking at a reverse speed.

The operator has a choice of four gear ranges forward and two in reverse. Selection of gear range 1 calls for operation only in first gear; selection of gear range 2 calls for first or second gear; selection of gear range 3 calls for operation in first, second or third gear; and operation in second, third or fourth gear is allowed by selection of gear range 4.

A magnetic pickup device, mounted adjacent to the transmission, monitors vehicle ground speed. Failure of the pickup device is sensed as zero speed; however, erroneous downshifting is avoided by monitoring a Pitot pressure switch, used as a redundant motion detector, to determine whether the vehicle is still in motion.

The counting means for motion detection and speed determination includes a timing circuit which produces clock pulses modulated by the throttle setting signal. At zero throttle, the frequency of the pulse train output is approximately 30 KHz., and this frequency rises approximately linearly to 50 KHz. at full throttle. The magnetic pickup pulses indicative of wheel speed act as reset commands to a 12-bit period counter which receives and counts the clock pulses from the timing circuit. The number of pulses sensed and counted by the counter, together with a signal indicating the gear range selected by the operator, is fed to a shift point code generator to generate a gear code which determines permissible gear choice (neutral, first, second, etc.); transmission upshift and downshift points are also determined by the gear code. Shift by the transmission into neutral gear from either forward or reverse directional gearing is permissible only if a "zero speed" signal is present, said signal being determined as the coincidence of a zero speed magnetic pickup signal and a zero speed Pitot pressure switch signal. In the preferred embodiment, this zero speed signal occurs whenever the vehicle is moving at less than 1 mile per hour.

If the gear range selector switch is moved by the operator to a gear setting lower than and not including the present gear command, a throttle inhibit signal is produced by the shift point code generator to simulate a full throttle signal at the timing circuit. This effectively translates the downshift point to 2800 r.p.m., so that in most situations downshift occurs expeditiously.

A separate safety device prevents the transmission from executing a forward-reverse shift without passing through a neutral gear shift position and without the vehicle first attaining the zero speed condition. The monitoring, comparison and commond-generating means are all digial, with the exception of the throttle setting monitoring means and the gear solenoid drivers.

As used herein, the word "signal" will designate any electrical manifestation having information content, such as voltage or current. As used herein the words "throttle position" or "throttle setting" are understood to include: (1) the throttle setting on a conventional combustion engine; (2) the rack position on a diesel engine; (3) the manifold pressure measured internally on an engine; and (4) any equivalent measure of engine effort.

Now, referring more particularly to the drawings and with reference to FIG. 1, the controller monitors wheel speed through a magnetic pickup device and also monitors throttle position and feeds these two signals to a shift point code generator 11.

The shift point code generator 11 generates a shift point code which indicates the range of permissible transmission gear choices, given the present vehicle speed and throttle position. The transmission is also monitored to provide a gear range select signal indicative of the gear range (neutral, first, second, third, fourth and pivot) chosen by the operator and to provide a separate signal for the directional gearing (forward or reverse) chosen. Finally, a Pitot pressure switch, located within or adjacent to the transmission, it also monitored to provide a redundant signal indicative of "zero speed" motion (actual speed less than or equal to 1 mile per hour).

The shift point code generator also produces a pulse count indicative of the vehicle speed. This pulse count, together with the Pitot pressure signal, is input to a zero speed detector circuit 13 which determines whether the vehicle is operating in the zero speed mode. If the vehicle is operating in this mode, a zero speed signal is input to a neutral shift detector 15; this detector also receives a gear range select signal. If neutral gear position has been selected by the operator, and if the vehicle is operating in the zero speed mode, a neutral command is produced by the detector 15 which is input to a forward/reverse command circuit 17 which also receives the forward/reverse directional gearing select signal from the transmission. The directional gearing may be switched from forward to reverse or from reverse to forward only if a neutral command is simultaneously received by the forward/reverse command circuit 17: In order to switch from forward to reverse or from reverse to forward, it is necessary for the vehicle to pass through neutral gear shift position, and this is possible only if the conditions required for appearance of the neutral command signal are present.

The neutral command signal, the gear range select signal and the shift point code signal are all input to a gear output command circuit 19 which determines the gear output command (neutral, first, second, third, fourth, pivot) which controls the solenoids which determine actual gear choice in the transmission. The gear output command circuit 19 is preset in a first gear, zero speed condition when the vehicle is first activated so that no undesirable initial states or starting transients are introduced by startup. These presetting operations are accomplished by a preset generator 63 which feeds the gear output command circuit 19; the present generator in turn receives inputs from the zero speed signal and the gear range select signal.

If the gear output command circuit 19 determines that a gear range has been selected which is lower than the present gear command, a throttle inhibit signal is produced by the command circuit 19 which is fed back to the shift point code generator 11. This throttle inhibit signal simulates the effect of full throttle condition in the generator 11 so that a gear downshift may be more easily implemented.

FIGS. 2A and 2B show more of the functional detail of FIG. 1. A throttle tranducer circuit 31 monitors throttle setting or engine torque and inputs this signal to a throttle signal amplifier and conditioner circuit 33 which then inputs the conditioned signal to a clock generator or timing circuit 35. This generator produces a pulse train of variable frequency; the frequency being dependent upon the throttle setting voltage received. Said voltage will normally range from zero to a voltage V2. A voltage of ⅓ V2 or less (this corresponds to full throttle) will result in a 50 KHz. signal; a throttle setting voltage of ⅔ V2 or more (this corresponds to idle) will result in a 30 KHz. signal. Between ⅓ V2 and ⅔ V2 input, the frequency of the output decreases approximately linearly with increasing voltage.

A magnetic pickup device 37 mounted on or adjacent to the transmission monitors wheel speed, producing a train of pulses whose period varies inversely with wheel speed. This pulse train is passed through a magnetic pickup amplifier and conditioner circuit 39, and the conditioned sequence of pulses is input to a strobe synchronizer 41 which also receives the pulse train generated by the clock generator 35. The strobe synchronizer 41 produces two pulse signals. The first is a clear or reset signal which is used to initialize a period counter 43 which receives and counts the high frequency pulses from the clock generator 35. This pulse signal is generated by the first high frequency pulse which arrives at the synchronizer 41 from the clock generator 35 immediately following receipt of each magnetic pickup pulse from the magnetic pickup amplifier and conditioner circuit 39. After the period counter 43 is reinitialized by this clear signal from the strobe synchronizer 41, the counter 43 begins anew to count the high frequency pulses arriving from the clock generator 35. This continually changing count is fed as a shift point code signal to a read only memory 45 which generates a gear code signal (again, continually changing) representing permissible choices of the transmission gear with the current vehicle speed and throttle setting. This gear code signal is input to an output data latch circuit 47 which serves as a secondary memory for the gear code information.

The controller will operate, in modified form, without the presence of the strobe synchronizer 41. However, it is preferable to synchronize the individual strobe pulses with the first high frequency pulse which arrives subsequent to said strobe pulse.

If the pulse count in the period counter 43 reaches an overflow condition, here taken to be receipt of 1,536 or more high frequency pulses in the interval (hereinafter defined as a strobe cycle) between any two consecutive magnetic pickup strobe pulses, the period counter generates an inhibit strobe signal which is input to a strobe gate circuit 49 which also receives a strobe pulse from the strobe synchronizer 41. If no inhibit strobe signal is received by the strobe gate circuit 49 during the present strobe cycle, the strobe gate circuit 49 merely passes said strobe pulse to the output data latch circuit 47, which circuit then inputs the stored gear information to a gear command decoder 51. If, however, an inhibit strobe signal has been received by the strobe gate circuit 49 during the present strobe cycle, no strobe signal will be produced for receipt by the output data latch circuit 47; in this instance, said latch circuit will not input any new gear code information to the gear command decoder 51.

Gear range select information is also input to the ROM 45. If the gear range selected is higher than and does not include the available gear, a throttle inhibit signal is generated and sent by the latch circuit 47 to effectively override the throttle circuit 33 so as to simulate a full throttle signal at the clock generator circuit 35.

Current information stored in the output latch circuit 47 is fed back to the read only memory continually to modify the ger code output. When the output latch circuit 47 receives a strobe pulse from the strobe gate circuit 49, gear code stored in 47 is updated and is input to the gear command decoder 51, which decodes the gear code and produces a gear command signal which is input to one of the gear solenoid drivers 53; the particular activated solenoid driver then activates the corresponding gear command solenoid 55 for choice of a particular gear in the transmission.

A Pitot pressure switch 57 acts as a redundant motion sensor for the vehicle. If the vehicle is moving at no more than 1 mile per hour (in forward or reverse), the switch 57 is closed, and this produces a zero speed signal which is input to a Pitot pressure switch input conditioning circuit 59 and is thereupon passed to a zero speed detector circuit 61. The detector circuit 61 also receives a signal from the period counter 43 indicative of pulse count overflow, corresponding to measured wheel speed of less than 1 mile per hour. If both signals indicate that the vehicle is in the zero speed mode, a zero speed signal is produced and input to a preset generator circuit 63. This circuit also receives a gear range select signal from the transmission gear range selector switch 65 after said signal has been passed through a gear selector switch input conditioning circuit 67. The preset generator circuit 63 continually senses whether the transmission gear position selected is neutral or first or some other gear; upon receipt of the zero speed signal from the zero speed detector circuit 61, and receipt of a gear range select signal indicative of neutral gear position or first gear, the preset generator circuit 63 produces a preset signal which reinitializes (to first gear, zero speed) the information contained in the output data latch circuit 47. The gear range select signal from the transmission range switch input conditioning circuit 67 is also input to the read only memory 45, for purposes of gear code determination, and to a neutral shift gate circuit 69 which determines whether the transmission should be commanded to shift to neutral gear position. The neutral shift gate circuit 69 also receives the zero speed signal from the zero speed detector circuit 61; only upon receipt of both said zero speed signal and said neutral select signal is a neutral command signal generated by the neutral shift circuit 69. If and when this signal is produced, it is input to the gear command decoder circuit 51 and thence to the gear solenoid driver circuit 53 and the gear command solenoid circuit 55 to require neutral gear position for the transmission.

The preferred embodiment of the controller also contains a forward/reverse switch 71, adjacent to the transmission, which produces a signal indicative of the choice of forward gearing or of reverse gearing in the transmission. This signal is passed through a forward-/reverse switch input conditioning circuit 73 to produce a forward/reverse select signal which is input to a forward/reverse shift gate circuit 75. This latter circuit also receives the neutral command signal, when produced, from the neutral shift gate circuit 69. The forward/reverse shift gate circuit 75 allows a shift from forward gearing to reverse gearing or from reverse gearing to forward gearing only upon receipt of an affirmative neutral command signal at 75. When said neutral command signal is received, a forward/reverse shift signal is produced by the gate 75 and is input to a forward/reverse decoder circuit 77 which also receives the neutral command signal. These signals are decoded by the decoder circuit 77 and the output, calling either for a forward-reverse shift or no shift, is input to the forward/reverse solenoid drivers 79 and thence to the forward/reverse solenoids 81 for response in the transmission.

In the preferred embodiment of the electronic transmission controller, the operator has available a choice of four gears forward, two gears in reverse, a neutral gear position and a pivot gear arrangement. If the pivot gearing is selected, the vehicle literally "turns on a dime," all wheels on one side of the vehicle turning in one direction (say, the forward direction) at a maximum speed of 2½ miles per hour and all wheels on the other side of the vehicle turning in the opposite direction (for example, the reverse direction) also at a maximum speed of 2½ miles per hour. The result of the choice of pivot gearing in the vehicle is that the vehicle center moves neither forward nor backward but merely turns in place for convenience of maneuvering. The pivot gear select signal is input directly from the transmission gear range selector switch input conditioning circuit 67 to the gear command decoder 51 and overrides all other gear choices. The pivot gear select signal is implemented only when forward gearing is selected by the operator.

Two neutral gear configurations are possible in the preferred embodiment. The first configuration corresponds to a command of neutral numerical gear position (not first and not second and not third and not fourth gear) at 53. The second configuration corresponds to a command of neutral gear position in the directional gearing (not forward and not reverse) at 77. An affirmative neutral command signal from the neutral shift gate 69 will cause both configurations to be neutral. An affirmative pivot gear select signal, however, results in a command of neutral numerical gear position (first configuration) and a command of forward directional gearing.

Referring to FIG. 3 which details the throttle setting sensing circuit, the throttle transducer 31 includes a variable resistor VR1 connected to a voltage source. The voltage signal sensed at VR1 is carried by line 101 through a resistor R2 and along line 103 to the negative inout of an operational amplifier A1. A capacitor C1 provides a shunt path to ground for noise on the throttle transducer signal line. Assuming the circuit to be in the non-throttle inhibit mode, the transistor T1 which communicates with line 103 through resistor R3 is turned on by a high base voltage applied along the line 105. The resistor R3 will now pass current along line 107, so that the resulting voltage at node point 109 is reduced from the voltage which is obtained with the transistor T1 turned off. With this reduced voltage extant, the diode D2 which forms part of a feedback loop 113 including amplifier A1 will be nonconducting. The reference voltage at node point 111, applied to the positive terminal of the amplifier A1, is determined by the voltage divider network comprising resistor R4 and R5; in the present embodiment, the reference voltage at node point 111 is chosen to be ⅓ V2. In the non-throttle inhibit mode considered here, the feedback loop 113 for the amplifier A1 effectively comprises a high value resistor R6 and a rate-limiting capacitor C2; the feedback loop thus functions conventionally, and the voltage at node point 115 is a measure of the excess of the throttle setting voltage appearing at node point 109 over the reference voltage at node point 111.

The voltage on output line 117 of the amplifier A1 will now be at least ⅓ V2; this signal is input to the CONTROL line of a pulse generator 119, the output on line 121 being a train of pulses whose frequency varies with the input voltage at CONTROL. Where said input voltage is ⅓ V2 or lower, the pulse frequency is approximately 50 KHz. and indicates full throttle setting. Where said input voltage is ⅔ V2 or higher, the pulse frequency is approximately 30 KHz. and indicates throttle idling. the pulse train frequency decreases continuously and approximately linearly with increasing input voltage between ⅓ V2 and ⅔ V2. In the non-throttle inhibit mode, with the CONTROL input voltage being at least ⅓ V2, the frequency of the pulse train output on line 121 will reflect the throttle setting of the variable resistor VR1.

When the throttle transducer amplifier and conditioner circuit 33 operates in the throttle inhibit mode, the voltage on the inhibit line 105 is low so that the transistor T1 is turned off. The voltage applied at node point 109 and at the negative terminal of the amplifier A1 is now substantially greater than the reference voltage at node point 111, by an amount which exceeds the forward biasing of the diode D2. A current therefore flows through diode D2 into the amplifier output terminal via the node 115. This causes the amplifier output voltage to be one diode junction bias voltage negative with respect to the reference voltage ⅓ V2 at node point 111, due to the modified feedback characteristics of the loop 113. This sharply reduces the gain of the amplifier A1 and results in a voltage signal arriving via line 117 at the pulse generator 119 which is below the full-throttle signal voltage ⅓ V2 for said pulse generator. Any voltage less than that corresponding to the full-throttle signal at the pulse generator 119 will result in a full-throttle signal (pulse train frequency 50 KHz.) being produced on output line 121. The net result of the throttle inhibit signal is that the pulse generator 119 outputs a full-throttle signal on line 121.

The output on line 121 is a high voltage signal, too high to be used in the subsequent circuitry. Therefore, the center of the signal is shifted (say, by approximately 6 volts) by passing said signal through a Zener diode Z1 and passing the resultant signal through an inverter I1 with a small amount of hysteresis introduced therein. Th output appears on line 123.

The high frequency signal appearing on line 121 is also brought back through resistor R9 to a test device at 127 for purposes of monitoring the frequency of the output on line 121.

Referring to the magnetic pickup amplifier and conditioner circuit 39 in FIG. 4, it is seen that a capacitor C5 and a resistor R10 are connected in parallel to the center tap on the primary winding of a transformer 131 that is connected to receive the signal input from the magnetic pickup device 37; the capacitor-resistor network here acts as a current bleed for DC and high frequency AC currents. The secondary winding of the transformer 131 is shifted with respect to ground by applying a positive reference voltage V3 to the center tap thereof. A first diode D3 and a second oppositely oriented diode D4 clip the signal from the transformer 131 and feed it through an impedance matching resistor R11 and filtering capacitor C6 to the input leads 133 and 135 of an operational amplifier A2. The output of this operational amplifier passes through a Zener diode Z2 and an inverter I2 to become a sequence of strobe pulses on the line 137. In case of a failure of the magnetic pickup device, the signal on output line 137 reverts to zero, indicative of true zero speed for the vehicle.

The Pitot pressure switch input conditioning circuit 59 comprises two resistors R12 and R13 which function as a voltage divider (divide by 5), a high frequency rolloff capacitor C7, an inverter I3 and a Zener diode Z3 which translates the input characteristic of the subsequent inverter I3, the resulting signal appearing on line 139. This centers the circuit hysteresis between the limits necessary for operation, and it also allows the application of large DC voltages issuing from the Pitot pressure switch 57. Resistor R12 supplies a DC current to the switch contacts in order to prevent the accumulation of any oxides thereon so that ordinary switches may be used as the control elements here. This same conditioning circuit, consisting of two resistors, a capacitor, a Zener diode and an inverter in the same configuration, is used as an input conditioning circuit for the gear range select signals, the pivot signal and the forward/reverse select signal as shown in FIG. 4.

The logic used subsequently in the controller requires that the fourth gear range select signal on line 141 and the third gear range select signal on line 143 be combined as shown so that a high voltage signal on output line 145 indicates that either third gear range or fourth gear range has been selected, a low signal appearing thereon if neither of the gear ranges has been selected. Similarly, the fourth gear range select signal on line 141 is combined with the second gear range select signal on line 147 as shown so that the output appearing on line 149 is high if and only if either second gear range or fourth gear range has been selected by the operator.

The first gear range select signal appearing on line 151 is not needed in the controller logic, but is included herein for purposes of operation in the alternative manual shift mode.

A high voltage signal appears on line 153 if neutral gear position has been selected by the operator; a high voltage signal appears on output line 155 if the operator chooses to operate in the pivot mode; and a high voltage signal appears on output line 157 if the operator chooses forward gearing as opposed to reverse gearing for operation of the vehicle.

The strobe synchronizer 41 (FIGS. 2, 5) comprises two dual D-type flipflops 161 and 165 and a capacitor C8 used to prevent the appearance of transient signals on th input to the first stage flipflop 161. A sequence of strobe pulses arrives on line 137 at the CP input of flipflop 161. The D input of flipflop 161 is held high; as each positive-going strobe pulse arrives at the C input the high D signal is transferred to the Q output and from there via line 163 to the D input of the second stage flipflop 165. Immediately subsequent to this, a first-occurring high signal from the high frequency pulse train carried on line 123 arrives at the C input of flipflop 165. This arrival transfers the D input to the Q output of flipflop 165 so that the $\overline{Q}$ output goes low; this $\overline{Q}$ output is transferred via line 167 to the RD input of the first stage flipflop 161, immediately erasing the high Q output on this first stage. The D input of the second stage flipflop 165 then alos goes low. Thus, the arrival of subsequent clock pulses on line 123 will not create further high signal Q outputs at line 171 of the second stage flipflop 165.

In the preferred embodiment, the period counter 43 (FIGS. 2 and 5) comprises three synchronous 4-bit counters, 173, 175 and 177, each having preset and reset capability and a terminal count TC output indicative of overflow in each counter. The $\overline{Q}$ output of the second stage flipflop 165 is fed via line 167 to the $\overline{PE}$ inputs of each counter so as to initialize them at the beginning of each cycle. The first stage and second stage counters 173 and 175 are initialized to zero, and the third stage counter 177 has an initial value of 9. Thus, the first stage counter 173 will overflow through its terminal count output 179 when the internal count reaches 16 or higher; the second stage counter 175 will overflow via its terminal count output line 181 when the total count contained in the counters 173 and 175 reaches 256 or higher; and the third stage counter will overflow via the terminal count output line 183 when the internal count for the three counters 173, 175 and 177 reaches a value of 1,536 or higher (6 times 256 = 1,536).

The high frequency pulse train arrives via line 123 and is fed to the CP input on each counter. A positive signal received at the CEYT input line on a given counter serves to enable that counter so that it begins to count the pulses arriving at the CP terminal. Initially, only the CET input of the first stage counter 173 is enabled so that only the clock pulses arriving at the counter are counted. The terminal count output on line 179 of the first stage counter 173 is input to the CET input of the second stage counter 175 and serves to enable said second stage counter. Similarly, the terminal count output on line 181 serves to enable the third stage counter 177. The terminal count of the third stage counter 177 is output on line 183, inverted by the inverter I4, and input via line 187 to the CEP inputs of each of the counters 173, 175 and 177. Each of the counters is enabled to count clock pulses arriving only if the signal at the corresponding CEP inlet of that counter is high. In the present configuration, all three CEP signals are high initially, and all three become low simultaneously upon overflow through the terminal count output of the third stage counter 177. Thus, as soon as the overflow occurs in the third stage counter 177, all three counters are disabled and further pulses which arrive via line 123 have no effect until another strobe pulse arrives on line 137 from the magnetic pickup.

The four digit outputs on lines 189, 191, 193 and 195 of the second stage counter 175 are a digital representation of the various vehicle speed and throttle position combinations which need to be known in order to make the proper shift point decisions in the transmission controller. These four outputs are fed directly to the read only memory (ROM) 45. For purposes of comparison, two additional inputs to the ROM, lines 225 and 227, carry information on gear commands earlier generated by the ROM. Two further signal inputs to the ROM are carried on lines 145 and 149, representing respectively the third and fourth gear range select signal and the second and fourth gear range select signal. The ROM functions as a table lockup device having an array of 256 possible outputs. In the present embodiment, only three information output signals are needed, carried on output lines 199, 201 and 203. the ROM determines which gear choices are permissible, given the present throttle setting and vehicle speed. A high signal on output line 199 indicates that either third or fourth gear or both is permissible; a high signal on output line 201 indicates that either second or fourth gear or both is permissible; and a high signal on output line 203 commands that a throttle inhibit signal be produced since the gear range selected by the operator is lower than and does not include the presently available gear in the transmission.

The stroke gate 49, comprising the inverters I5, I6, and I7 and the NAND gate 213, is interposed to control the output of the output data latch circuit 47. One or the other or both of the Q1 and Q2 outputs (second and third most significant binary digits) of the third stage counter 177 becomes non-zero as soon as the second stage flipflop 175 experiences an overflow (total internal count larger than 255). Overflow in the second stage flipflop 175 indicates that the vehicle speed is below that which corresponds to the shift point codes generated by the period counter 43. When this occurs, the strobe pulse carried on line 171 must be inhibited so that the output of the output latch circuit 47 is not changed while this condition persists.

The Q1 and Q2 outputs (strobe inhibit) of the counter 177 are fed via lines 205 and 207, respectively, to inverters I5 and I6, respectively, and input to a common NAND gate 213 which also receives the Q output signal on line 171 from a second stage flipflop 165. The output of the NAND gate 213 is inverted at I7, and the resulting signal on line 217 will be high if and only if said Q1 and Q2 outputs are both low (no overflow) and the Q output on line 171 of the strobe synchronizer second stage flipflop 165 is high (occurs only at the beginning of a strobe cycle). If either of the strobe inhibit outputs carried on lines 205 and 207 is high, or if the signal on line 171 is low, the output strobe signal on line 217 is low.

The output signals from the ROM 45 are continually changing, in response to the accumulating counts in the second stage counter 175. At the instant of a strobe pulse, the transmission controller must remember the output stage of the ROM, since it is this information upon which the controller acts. The output data latch circuit 47 comprises three dual D-type flipflops 219, 221 and 223 arranged in parallel as shown. The flipflop 219 receives the ROM signal appearing on output line 201, and the flipflop 221 receives the signal appearing on the ROM output line 199. Each of these two flipflops is strobed by the output strobe signal arriving on line 217, which output strobe signal is high only initially during the strobe cycle. A third flipflop 223 receives the throttle inhibit signal via line 203 from the ROM 45 and is also strobed by the output strobe signal on line 217. A high signal appearing on Q output line 225 of the flipflop 219 indicates a gear command for second gear or fourth gear or both. A high signal appearing on Q output line 227 of the flipflop 221 indicates a gear command for third gear or fourth gear or both. The signals appearing on the lines 225 and 227 are looped back and fed through the ROM 45 for comparison purposes.

A high $\overline{Q}$ output at the flipflop 223 is indicative of a throttle inhibit command and is looped back via line 105 and input to the throttle transducer amplifier and conditioner circuit 33.

Certain conditions, such as turning on power initially to the system, can cause a flipflop to assume an undesired state. It is therefore necessary to have a preset input to the three flipflops 219, 221 and 223. The preset operation establishes first gear with no throttle inhibit as the output state of these three flipflops and appears on line 261 initially as a low signal which resets each flipflop as shown; said preset operation is initiated when the vehicle speed is very low and neutral or first gear is selected by the operator, as is shown most clearly in FIG. 6.

With reference to FIG. 6, the flipflop 241, NAND gate 245 and inverter I10 comprise the zero speed detector circuit 61. As noted above, the output line 183 of the third stage counter 177 carries a high signal if and only if said counter has overflowed. This is indicative of a very low speed (less than one mile per hour, hereinafter denoted the "zero speed" condition). The signal on line 83 is inverted at I4, and the resulting signal is fed to the reset input of a flipflop 241 which has both the D and CP inputs held permanently high. The signal on line 187 is low if and only if the zero speed condition is present, and his low signal resets the flipflop 241 so that the $\overline{Q}$ output on line 243 goes high.

The flipflop 241 is initially set by the clear signal carried by line 167 to the SD input of said flipflop; said clear signal, it will be recalled, is generated by the second stage flipflop 165 upon initial receipt of each magnetic pickup pulse (FIG. 5).

The Pitot pressure switch signal on line 139 and the counter zero speed signal appearing on line 243 are both input to a NAND gate 245 whose output is inverted at I10 to obtain a signal on line 249 which is high if and only if both the Pitot pressure switch 57 and the count in the third stage 4-bit counter 177 indicate that the zero speed condition is present. Thus, the NAND gate 245 functions as a redundant zero speed indicator.

The signal on line 145 (indicative of selection of third or fourth gear range by the operator) and the signal on line 149 (indicative of selection of second or fourth gear range) are inverted by respective inverters I8 and I9, and the respective outputs on lines 255 and 257 are input to a NAND gate 259 together with the zero speed signal appearing on line 249. The output appears on line 261 and is used as the preset signal in flipflops 219, 221 and 223 (FIG. 5). The output signal appearing on line 261 will be high unless the vehicle is operating in the zero speed mode and the gear range selected is neither second nor third nor fourth.

The zero speed signal on line 249 is also fed to a NAND gate 263, which NAND gate also receives the neutral select signal on line 153. The output of this NAND gate, appearing on line 265, will be low if and only if the vehicle is operating in the zero speed mode and neutral gear position has been selected by the operator. The NAND gates 263, 267 and 269 and the inverter I13 comprise the neutral shift gate circuit 69, which will produce and hold a neutral command signal on output line 273 (low corresponds to neutral) if and only if the vehicle is operating in the zero speed mode and neutral gear position has been selected by the operator. Inclusion of the flipflop memory means comprising the NAND gates 267 and 269 retains the state established by the last occurance of the zero speed signal and/or the neutral select signal within the current strobe cycle. The resistors R14 and R15 and the capacitor C9 are included so that the flipflip memory means is insensitive to noise or set-reset signals.

The forward/reverse shift gate circuit 75 comprises the NAND gates 283, 285, 289, 291, 295, 301, 303, the inverters I11 and I12, and a noise desensitizing circuit comprising the resistors R16 and R17 and the capacitor C10. One purpose of the gate is to prevent activation of a forward-reverse shift unless an affirmative neutral command signal (low) is present; another purpose is to act as a memory means to retain the forward/reverse select signal until activation of the forward-reverse shift is possible.

The inputs to the shift gate circuit 75 are the forward/reverse select signal appearing on line 157, the neutral command signal appearing on line 273 and a feedback signal generated internal to the circuit, on line 287. The crisscrossed flipflops 289 and 291 comprise a memory means for recalling what directional gearing command (on lines 281 and 299) was last produced by the circuit 75. The inclusion of this memory means enables the circuit to hold and not act upon an improper forward/reverse select signal (requiring shifting) and to retain the present directional gearing command until such a shift is permitted by the circuit. The forward/reverse shift gate 75 prevents the output of inverter I12, appearing on line 311, from calling for a forward-reverse shift unless the neutral command signal is affirmative (low). If an affirmative neutral command signal is not currently present but the operator selects a shift in gearing from forward to reverse or from reverse to forward, the flipflop memory means (289, 291) will ignore this command and will remember the directional gearing command extant just prior to receipt of the improper forward/reverse select signal.

The forward/reverse shift gate circuit 75 is described herein under three conditions. In the first condition, the forward/reverse directional gearing select signal on line 57 and the gearing command appearing on line 311 agree. If, for example, both directional gearing select and directional gearing command call for forward gearing, so that the signal on lines 157 and 311 are both high, upon a subsequent shift of the forward/reverse directional gearing select lever to reverse gearing (signal goes low), this shift will be executed if and only if the neutral command signal appearing on line 273 is low; in this instance, the outputs appearing on lines 281 and 299 will be high and high, respectively, and the output on line 311 will be low, calling for a shift from forward to reverse. If the neutral command signal appearing on line 273 is high, no change will be made in the output states of the flipflops 289 and 291 (high and low, respectively), and the output signal appearing on line 311 will still call for forward gearing.

The situation is analogous where reverse gearing has been selected by the operator and a reverse gearing command appears on line 311. A subsequent selection of forward gearing (line 157) by the operator will be acted upon by the forward/reverse shift gate circuit 75 if and only if an affirmative neutral command signal is present on line 273.

In the second situation considered, the forward/reverse directional gearing select lever is moved while the vehicle is in motion and not operating in the zero speed condition. This move will not affect the outputs of the memory means flipflops 289 and 291, and no shift in forward/reverse gearing will occur.

The third situation occurs when the vehicle is already operating in the zero speed mode and the directional gearing select lever is moved, say, from forward to reverse. In passing from forward to reverse, a neutral select signal will be generated on line 153 for a short period of time, and this will cause an affirmative neutral command signal (low) to appear on line 273. Under this condition, the output on line 296 will be high, and the set and reset lines 286 and 305 to the memory means flipflops 289 and 291 will both be determined directly by the forward/reverse select signal on line 157. This will cause the memory means flipflops 289 and 291 to be set or reset to the condition corresponding to the subsequent choice of forward/reverse directional gearing selected as the lever is moved.

Note that the transmission will not execute a forward-reverse shift merely because the vehicle speed drops below 1 mile per hour. Concurrence of the zero speed condition and the neutral gear select condition is required to generate a neutral command signal (low) on line 273; and in the absence of the neutral command signal, the forward/reverse shift gate circuit 75 will not be activated.

The neutral command signal on line 273 and the output of the forward/reverse shift gate circuit 75 on line 311 are input to a BCD-decimal decoder 313 which determines the forward/reverse command signal. When the neutral command line is high, a forward command signal appears on output line 319 if the sum of the activated binary digits is three, and a reverse command signal appears on line 317 if the sum of the activated digits is one. If a neutral command signal (low) is present, the sum of the activated digits is either zero or two; this will override any forward or reverse gearing selected, and the neutral select signal will appear on output line 315.

An identical BCD-decimal decoder 321 is used to determine the numerical choice of gear command (first, second, third, fourth, pivot). The neutral command signal line 273 feeds the binary weight 1 input of the decoder 321. The line 225, which is high if and only if second gear and/or fourth gear is called for by the ROM 45, feeds the binary weight 2 input line of the decoder 321. Line 227, which is high if and only if the ROM 45 calls for third gear and/or fourth gear, feeds the binary weight 4 input line of the decoder 321. Finally, the pivot select line 155 feeds the binary weight 8 input line of said decoder.

If the pivot select signal on line 155 is high, this will override all other inputs and none of the four gear command output lines 323, 325, 327 and 329 will be activated (all low). In this instance, the vehicle will operate only in the pivot mode as described above. If the pivot select line 155 carries a low signal (pivot inactive), and if the neutral command signal on line 273 is low, only even numbered output lines in the decoder 321 will be energized, irrespective of the other inputs of the decoder; this implements the neutral condition on the output, which condition overrides all other numerical gear commands. If the neutral command signal appearing on line 273 is high and if the pivot select signal appearing on line 155 is low, then one and only one of the numbers 1, 3, 5, and 7 will be produced by the decoder 321, according to the signals appearing on input lines 225 and 227. These four numbers correspond, respectively, to gear command signals for first gear, second gear, third gear or fourth gear on the respective output lines 323, 325, 327 and 329. For example, if line 273 is high, line 225 is low, line 227 is high and line 155 is low, the number generated is 5 (= 1 + 4), and therefore the third gear command signal is produced on output line 327.

FIG. 7 shows the six identical gear command solenoid driver circuits for first gear, second gear, third gear, fourth gear, forward gearing and reverse gearing. Referring to the first gear solenoid circuit (activated by input line 323), the basic circuit comprises the transistors T2 and T3 connected to an inverted Darlington configuration, a thermistor RT1 connected across base and emitter of transistor T2, a resistor R18 interposed between the base of T2 and the gear command signal input on line 323, a Zener diode Z4 interposed between line 323 and ground, a resistor R19 connected across base and emitter of transistor T3, a diode D5 and a resistor R22 in parallel connecting the base of T3 to ground, and a resistor R20 connected between the DC voltage power input V15 and the collector of T3. In order to turn on the output stage, a current must pass from the base of T2 through R18, and R18 is chosen to have a resistance value of many kilohms. This current flow will occur if: (1) the input terminal signal on line 323 is grounded by the corresponding decoder driver 321 or (2) the vehicle electrical system experiences a transient voltage which raises the positive bus voltage V15 to a point where the Zener diode Z4 conducts. In this latter situation, the transients are applied to the solenoid inductance and the transistors T2 and T3 turn on to avoid over-voltage breakdown problems. The diode D5 will turn on when the circuit input (line 323) drive current is removed since the stored energy in the inductor will cause the output terminal (line 323) to swing to a substantial negative voltage. Turning D5 on causes transistor T3 to continue to conduct; the solenoid current and also the current in line 331 then decay exponentially to zero rather than decaying abruptly. This avoids system voltage disturbances which occur with an aprutp current decay.

Addition of the transistor T4 and associated resistors R21 and R23 as shown allows the curcuit to operate into a short circuit load on line 333. In the short circuit situation, the voltage across R20 will turn T4 on and thus bypass a portion of the drive current flowing in R18 and R21 and limit the output current to perhaps 1.5 amps. This current will cause the T2 collector temperature to rise. Thermistor RT1, which is in physical contact with the T2 collector and has a negative temperature coefficient of resistance, conducts more current and thus reduces the drive current to transistor T3, resulting in a final operating state where T2 passes at most 0.5 amp into the short circuit load.

An alternative embodiment allows the elimination of the connection between the magnetic pickup amplifier and conditioner circuit 39 or the strobe synchronizer 41 or the strobe gate 49 and the output data latch circuit 47, which achieves some simplification. In this alternative embodiment, the three D-type flipflops 219, 221 and 223 are eliminated and one interposes an identical D-type flipflop on each of the output lines 189, 191, 193 and 195 of the second stage counter 175, each new D-type flipflop again being strobed via the output on line 217 from the strobe gate. These four new flipflops comprise a new output data latch circuit, interposed between the period counter 43 and the read only memory 45. The three output lines 199, 201 and 203 of the read only memory 45 are now passed directly along lines 227, 225 and 105 respectively. The output of said memory 45 is no longer continually changing; instead, it changes only in response to the strobe pulses delivered to the four new D-type flipflops comprising the new output data latch circuit. This simplification is, of course, achieved at the cost of using one more D-type flipflop in the circuit.

FIG. 8A shows the automatic controller installation electrical harness schematically. The forward/reverse select switch is connected to the gear select switch, and the resulting signals are input to the transmission controlled through the inlet ports 341. The controller receives information on vehicle speed, Pitot pressure and throttle setting through the inlet ports 343, and the gear command signals issue from the exit ports 345.

The electronics of the controller are so arranged that the cables which normally plug into the controller at the ports 345 may be disconnected therefrom and plugged directly into the gear select switch to implement manual control of the transmission, as shown in FIG. 8B. In this (manual) mode, the cables connecting the gear select switch with the controller inlet ports 341 are disconnected from the gear select switch.

As used in the following claims, "throttle" and "throttle settings" should not be deemed to be limited to a throttle and throttle settings, respectively, on a conventional combustion engine; these terms, as mentioned hereinabove, may also refer to a rack and rack setting, respectively, in a diesel engine, to manifold pressure measured internally on an engine, or to any other measure of engine effort.

Although the best mode contemplated for carrying out the present invention has been herein shown and described, it will be apparent that modification and variation may be made without departing from what is regarded to be the subject matter of the invention.

What is claimed is:

1. In an electronic transmission controller for a vehicle having an engine, a throttle for controlling the torque of the engine, a ground engaging wheel, a transmission with a neutral gear shifting position and a plurality of reverse and forward gear ratios, selector means for selecting a range of said gear ratios in which said transmission is to be operated, and gearshift means for shifting from one range of gear ratios to another, the controller comprising throttle signal generating means connected to the throttle for producing a throttle setting signal indicative of a throttle setting variable up to a full throttle setting, wheel speed strobe generating means operatively associated with the ground engaging wheel for producing a sequence of wheel speed strobe signals with periods indicative of the rotational speed of the wheel, oscillatory signal generating means operatively associated with the throttle signal generating means for producing an AC signal of varying frequency, the frequency being indicative of the throttle setting signal, shift point code signal generating means operatively associated with the wheel speed generating means and with the oscillatory signal generating means for producing a shift point code signal indicative of permissible transmission gear choices, gear range select signal generating means operatively associated with said gear range selector of the transmission for producing a gear range select signal indicative of the gear range presently selected in the transmission by the operator, gear comparison and selection means operatively associated with the shift point code signal generating means and the gear range select signal generating means for comparing the shift point code signal and the gear range select signal and for producing a gear command signal which controls the transmission, and further producing a throttle inhibit signal whenever the gear command signal requires a higher gear than called for by the gear range select signal, throttle inhibit means responsive to the throttle inhibit signal for overriding said throttle setting signal and simulating a throttle setting signal at the oscillatory signal generating means indicative of a full throttle setting, and said gear comparison and selection means being operatively associated with the gear shift means for shifting the transmission in response to the gear command signal, whereby the controller will expeditiously issue a gear command signal for shifting the transmission to a next lower gear ratio in response to a shift point code signal derived from the wheel speed signal and the simulated full throttle setting signal without regard to the actual throttle setting signal.

2. An electronic transmission controller for a vehicle having an engine, a throttle for the engine, a ground engaging wheel, a transmission with a neutral gear shifting position, a plurality of reverse and forward gears, and a gear shift means, the controller comprising throttle signal generating means connected to the throttle for producing a throttle setting signal indicative of the throttle setting, wheel speed strobe generating means operatively associated with the ground engaging wheel for producing a sequence of wheel speed strobe signals with periods indicative of the rotational speed of the wheel, oscillatory signal generating means operatively associated with the throttle signal generating means for producing a pulse train of varying frequency, the frequency being indicative of the throttle setting signals, shift point code signal generating means including counting means operatively associated with said oscillatory signal generating means and with said wheel speed strobe generating means for counting the pulses from said oscillatory signal generating means between each pair of signals from said strobe generating means, said shift point code signal generating means producing a shift point code signal indicative of permissible transmission gear choices, gear range select signal generating means operatively associated with the transmission for producing a gear range select signal indicative of the gear range presently selected in the transmission by the operator, gear comparison and selection means operatively associated with the shift point code signal generating means and the gear range select signal generating means for comparing the shift point code signal and the gear range select signal and for producing a gear command signal which controls the gear shift means for shifting the transmission.

3. An electronic transmission controller according to claim 2 wherein said wheel speed strobe signal generting means includes a magnetic pickup device for producing pulses in accordance with the output shaft rotational speed.

4. An electronic transmission controller according to claim 2 wherein said gear comparison and selection means produces a throttle inhibit signal whenever the gear command signal requires a higher gear than called for by the gear range select signal, said throttle inhibit signal having the characteristics of a throttle setting signal indicative of a full throttle setting, and said controller further includes means for applying said throttle inhibit signal to said shift point code generating means so as to derive a shift point code signal therefrom, thereby expediting the shifting to the gear called for by the gear range select signal without regard to the actual throttle setting.

5. An electronic transmission controller according to claim 2 including zero speed signal generating means operatively associated with the transmission for producing a signal indicative of vehicle velocity being less than a predetermined velocity threshold, said counting means producing a counter overflow signal whenever said count signal of said pulse counter exceeds a predetermined pulse count threshold to indicate zero speed, signal generating means operatively associated with the zero speed signal generating means and with the counter overflow signal for producing a neutral shift signal.

6. An electronic transmission controller according to claim 5 including forward/reverse select signal generating means for producing a forward/reverse select signal indicative of the forward or reverse directional gearing in the transmission, further including forward/reverse shift signal generating means operatively associated with the forward/reverse select signal generating means and with the means for producing said neutral shift signal for producing a forward/reverse shift command signal, and further including forward/reverse gearing shift means operatively associated with the forward/reverse shift signal generating means and with the transmission for shifting the directional gearing from forward to reverse or from reverse to forward in response to the forward/reverse shift command signal.

7. An improved system for shifting the gear position of an automatic transmission of the type including signal generating means connected to the throttle of a vehicle for producing an engine torque signal indicative of a throttle setting variable up to a full throttle setting, means operatively associated with a drive wheel of the vehicle for producing a wheel speed signal representative of the rotational speed of said drive wheel, shift point code generating means for producing a shift point code signal indicative of permissible transmission gear choices, means for applying said engine torque and wheel speed signals to said shift point code generating means so as to derive said shift point code signal from said shift point code generating means, gear range select signal generating means for producing a gear range select signal indicative of the gear range selected by the vehicle operator, and gear comparison and selection means operatively associated with said shift point code signal generating means and said gear range select signal generating means for comparing the gear range select signal and the shift point code signal and producing a gear command signal at selected upshift and downshift points, said upshift points being selected to cause shifting from lower to higher gears in a particular gear range at upshift points modulated by said engine torque signals, siad downshift points being further selected to cause shifting from higher to lower gears in a particular gear range at downshift points also modulated by said engine torque signals, and each of said downshift points between adjacent gears having a controlled hysteresis from the upshift points between the same adjacent gears, wherein the improvement comprises:
said gear comparison and selection means also embodying means for producing a throttle inhibit signal whenever said gear command signal requires a higher gear than called for by the gear range select signal; and
means for applying said throttle inhibit signal to said shift point code generating means to produce a simulated engine torque signal therein which indicates a full throttle setting and to derive thereby a modified shift point code signal from said simulated engine torque signal and said wheel speed signal, whereby a gear command signal is produced by said gear comparison and selection means in response to the modified shift point code signal to cause shifting at downshift points determined by said modified shift point code signal, thereby overriding said controlled hysteresis and causing expeditious downshifting to the gear range selected by the operator.

* * * * *